United States Patent Office 2,962,305
Patented Nov. 29, 1960

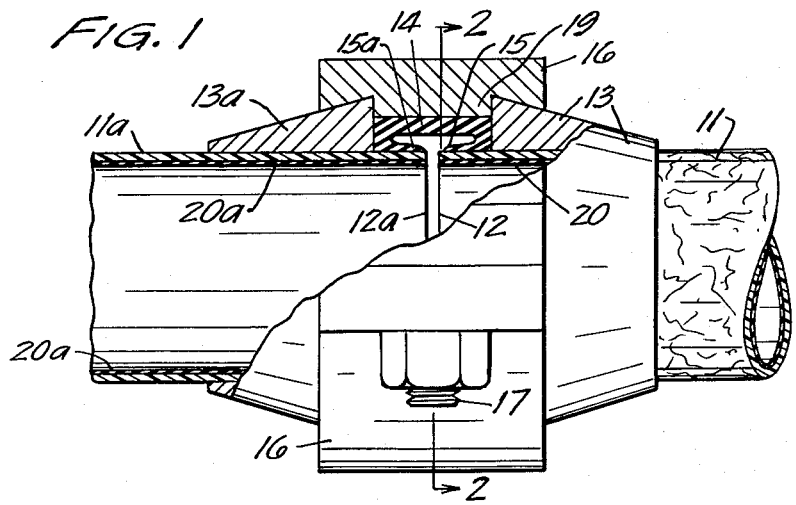
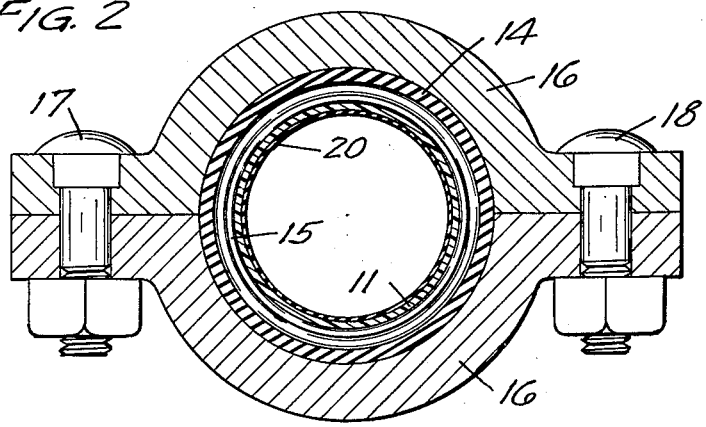
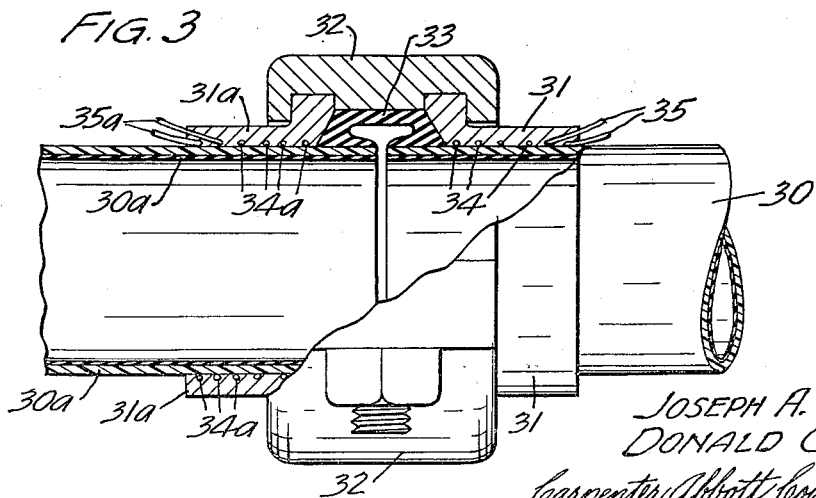

2,962,305

COUPLING FOR REINFORCED RESINOUS PIPE

Joseph A. McCarthy, Mahtomedi, and Donald G. Lorimer, Minneapolis, Minn., assignors to Minnesota Mining and Manufacturing Company, St. Paul, Minn., a corporation of Delaware Filed Oct. 1, 1956, Ser. No. 613,256

4 Claims. (Cl. 285—112)

This invention relates to disconnectable, rigid, fluid-tight couplings for reinforced resinous pipe and particularly provides means for incorporating reinforced resinous pipe, which has been cut to desired lengths, into an impervious fluid-handling system.

Recent advances in the reinforced plastic art have demonstrated that a potentially large market exists for reinforced resinous pipe, particularly for handling caustic fluids or for use in areas where pipe is exposed to corrosive attack. However, the reinforced resinous pipe which thus far has proved to be competitive with steel and aluminum pipe for conveying fluids under high pressure cannot be cut and threaded in the manner of metal pipe because of the thinness of its wall. Normally, a reinforced resinous pipe member is provided with upset male threads at each end of the pipe, with the upset material and the wall of the pipe member cured in place simultaneously to provide an integral structure. Efforts at adhering upset threads to the pipe member after its wall has been cured to a resinous or substantially infusible, insoluble state produce uncertain results because it is difficult to obtain an adhesive bond which is impervious at high fluid pressures. While a fairly good bond may be achieved if the resin of the thread material is cured in contact with the precured pipe wall, this procedure generally entails resort to the use of an oven. Of even greater importance is the fact that few resin-forming compositions can be retained in an uncured state for extended periods.

Reinforced resinous pipe members have also been coupled by means of gaskets and clamps, with the clamp gripping either the end of the pipe or a shoulder, which shoulder may be formed either integrally with the pipe or by cementing a collar in place. Couplings which require gripping of the unprotected pipe are entirely unsuited to high pressure installations as are couplings which utilize cemented collars, the adhesive bond of the latter lacking the required impermeability, particularly when exposed to hot or caustic fluids carried under pressure by the pipe. Integrally formed collars, like integrally formed threads, do not admit of cutting the pipe to desired lengths in the field.

Because of the shortcomings of prior means for connecting lengths of reinforced resinous pipe, the use of such pipe has heretofore been virtually restricted to the replacement of standard lengths of pipe in existing installations. By the present invention, it is for the first time practicable to set up a complete installation for carrying fluids at high pressures using reinforced resinous pipe exclusively. This objective is realized through the use of the novel couplings of this invention, whereby reinforced resinous pipe may be cut to desired lengths in the field and joined securely together by convenient and reasonably fast procedures to provide impervious connections in high pressure lines. Since each coupling is a union, the connections may be readily broken and reconnected at any point. In addition to the resultant convenience in maintenance in having a union at every connection, no torque is transmitted to the pipe in making a connection so that wrench marks or scratches on the surface of the pipe are avoided.

The structure of the novel coupling for reinforced resinous pipe may best be understood by reference to the drawing of which:

Figure 1 is an elevational view in part cut away to a central section showing the connection of two lengths of reinforced resinous pipe by a coupling embodying the features of this invention;

Figure 2 is a sectional view taken along line 2—2 of Figure 1; and

Figure 3 illustrates another specific embodiment of the invention by an elevational view in part cut away to a central section.

Referring first to the coupling illustrated in Figures 1 and 2, a pair of rigid, thin-walled cylindrical reinforced resinous pipe members 11 and 11a have been cut at right angles to provide each with a squared end 12 and 12a, respectively. To assemble the coupling, a pair of strong rigid annular collars 13 and 13a are selected to fit slidably over pipe members 11 and 11a, respectively. The outer cylindrical surfaces of the pipe members and the axially elongated cylindrical internal surfaces on the annular collars are then coated with self-curing adhesive, and the collars 13 and 13a are positioned on the respective pipe members 11 and 11a, each at a predetermined distance rearwardly of the end 12 or 12a of the pipe member.

As soon as the adhesive has set, the two pipe members may be connected to provide a fluid-tight seal. For this purpose is required an annular rubber gasket 14 having an essentially C-shaped cross section. The open ends of the C define a pair of opposed feathered edge portions 15 and 15a forming two separated cylindrical bearing surfaces each having a diameter slightly smaller than the outside diameter of the corresponding pipe member, thus allowing the rubber gasket 14 to fit snugly as illustrated in Figure 1. The feathered edges 15 and 15a and the corresponding pipe ends 12 and 12a are separated sufficiently to permit access of fluid carried by the pipeline to the open interior of the gasket 14.

With the gasket 14 in place, the connection is secured by means of a symmetrical split clamp 16, the inner facing surface of which is shaped to conform with and so support the outer circumferential surface of the gasket and to bear against the adjacent portions of the collars 13 and 13a by the peripheral inwardly extending clamping lips of the clamp 16. As the clamp 16 is tightened by means of bolts 17 and 18, forces directed in all radial directions against the collars 13 and 13a also exert a substantial longitudinal thrust on each of the collars, forcing them toward each other and against the inner circumferential tongue portion 19 of the clamp 16 to restrain the pipe members 11 and 11a against relative movement. The tongue portion 19 of the clamp 16 also serves to constrict the gasket 14 and force it against the free end portions of the pipe members 11 and 11a to provide a fluid-tight seal between the gasket 14 and each of the pipe members 11 and 11a.

In actual operation, fluid carried in the pipeline flows between the pipe ends 12 and 12a into the open interior of the gasket 14 and exerts hydrostatic pressure in all directions against the gasket. Under pressure, the gasket tends to expand and to press tightly against the flat opposing faces of the collars 13 and 13a to draw the feathered edges 15 and 15a back along the surfaces of pipe members 11 and 11a. This action coupled with the hydrostatic pressure exerted directly upon the feathered edges 15 and 15a increases the sealing force along the surfaces of the pipe members 11 and 11a to maintain a fluid-tight seal regardless of pressure.

The specific embodiment illustrated in Figures 1 and 2 of the drawing has been constructed and tested in conjunction with nominal two-inch reinforced resinous pipe. The structural wall of the pipe consisted essentially of a cured epoxy resin composition reinforced with lineally-aligned glass filaments and included a surface layer of resin-impregnated fibrous glass mat. The pipe incorporated, for improved impermeability at continuous fluctuating high pressures, liners 20 and 20a as indicated in Figure 1.

Annular collars 13 and 13a were molded from a mixture of resin and glass fibers. Specifically, the glass fibers were chopped strands of "Fiberglas" yarns of one-half inch length marketed by Owens-Corning which represented the product to be prepared from continuous filament strands having a chrome hard binder, the individual filaments averaging 0.00038 inch in diameter. The resin consisted of a mixture of 30 parts plastisol grade polyvinyl chloride, viz., "Geon 121," 15 parts by weight of meta-phenylene diamine, and 100 parts epoxy resin ("Epon 828," a product of the Shell Chemical Corporation and believed to be the reaction product of epichlorhydrin and bisphenol) having a melting point of about 8–12° C. as determined by the Durrans' Mercury Method and an epoxide equivalent weight of 190–210. Forty parts of the resin were kneaded together with 60 parts by weight of the glass until a homogeneous mixture was obtained. This mixture was molded to shape in a steel die which had been previously coated with a suitable mold release agent. The whole was then placed for about 20 minutes in a press, the platens of which were heated to about 350° F. The die was then removed and the molded collar was placed in an air-circulating oven for two hours at 350° F., at which time the resin was fully cured to a substantially infusible, insoluble state. The collar thus produced had a maximum outside diameter of about 3.30 inches tapering inwardly at an angle of about 15 degrees to provide a conical outer surface. Its axial length was about 1.5 inches and inner diameter about 2.290 to 2.300 inches as compared to maximum outside diameters for the pipe members of 2.290 inches.

Two such annular collars were adhered to a pair of pipe members using as the adhesive a mixture of liquid epoxy resin and ten parts of diethylene triamine per 100 parts of resin, which mixture was spread on both the external surfaces of the pipe and the internal surfaces of the collars. The adhesive at the same time was spread over the ends 12 and 12a of each pipe member to seal voids which might be present in its wall. The collars were then positioned about 0.4 inch rearwardly from the pipe ends 12 and 12a and the adhesive was allowed to cure for one hour at 200° F. The pipe members were joined by a steel clamp of sufficient size to cover about one-half inch of the external conical surface of each of the collars 13 and 13a. A synthetic rubber gasket of C-shaped cross section was used, specifically 2" Pipe Gruvagrip Style–C, a product of the Gustin Bacon Mfg. Co.

The lengths of pipe thus coupled were connected into a water-carrying line and then immersed in water heated to 150° F. The pressure in the lines alternated between 250 and 1000 pounds per square inch at the rate of 34 cycles per minute. After 98,000 cycles, the wall of one section of the test pipe failed at a point remote from the coupling, but the coupling and the portions of the pipes to which the collars were adhered evidenced no wear.

A number of modifications in the design of the individual components and the materials of which they are constructed will occur to those skilled in the art. For example, couplings utilizing collars of L-shaped rather than conical cross-section have demonstrated utility. A number of such changes are embodied in the coupling illustrated in Figure 3 to which reference now is made. Two lengths of rigid, thin-walled reinforced resinous pipe 30 and 30a are provided with annular collars 31 and 31a having essentially L-shaped cross sections. Upon tightening the split clamp 32, the C-shaped gasket 33, although geometrically somewhat different from the gasket 15 illustrated in Figures 1 and 2, performs the same function of sealing fluids at the surfaces of the pipe members 30 and 30a. The clamp 32 does not produce a longitudinal force in the system when tightened, as was the case in the coupling of Figures 1 and 2. However, the inner surface of the clamp 32 is formed to provide close contact with both the facing upstanding abutment walls of the collar members 31 and 31a and with the outer surfaces of said collars between the facing and remote ends thereof, and thus to restrain the pipe members 30 and 30a against relative movement.

In order to eliminate play and consequent abrasion between opposed surfaces, the portions of the collars 31 and 31a extending radially outwardly beyond the gasket 33 and the matching recesses of the clamp 32 require low tolerance manufacture. In contrast, the coupling of Figures 1 and 2 does not include any dimension of close tolerance. Accordingly, it is preferred that the coupling design incorporate means, as does the coupling of Figures 1 and 2, for imparting a longitudinal thrust upon each of the pipe members as the clamp is tightened to force the pipe members toward each other and against a rigid restraining member as exemplified by the tongue portion 19 of the clamp 16.

While this invention is also applicable to the coupling of reinforced resinous pipe members having integrally formed collar members, it is primarily aimed at providing fast and convenient means for the coupling of odd lengths of pipe in the field. In such use, it is highly desirable that the collars become firmly bonded to the pipe as fast as possible. All adhesives known to the inventor which harden without evolution of volatiles and which remain spreadable and tacky for a reasonably long period set rather slowly at room temperatures, but many advance to full strength quickly at elevated temperatures. For example, the epoxy resin adhesive utilized in the above-described tests sets overnight at normal room temperatures to approximately 20 percent of full strength and reaches maximum strength in about one week. The same adhesive cures to full strength in less than one-half hour at 200° F. However, the use of an oven or the like in the field is not always convenient.

Referring again to Figure 3, near the inner surface of each of the annular collars 31 and 31a is embedded a heating coil 34 and 34a through which electricity may be passed from a set of portable batteries. After the adhesive has cured, the leads 35 and 35a to the corresponding coils 34 and 34a are clipped off.

While the heating coils are most conveniently embedded in the annular collars if the collars consist of resinous material, coils may alternatively be embedded in the surface of the pipe or even in the layer of adhesive itself. A number of other means of heating the adhesive layer are also feasible and will occur to those skilled in the art in light of the teachings set forth hereinabove. For example, heat from a blow torch or the like may be conducted to the adhesive by means of metal strips, threads or mesh incorporated into the structure at or near the adhesive layer. If the collar is formed of metal, the heat may be transmitted therethrough with no difficulty. However, it is normally preferred that the collar be formed of reinforced resinous material for esthetic purposes as well as to realize the same excellent chemical and corrosion resistance as the wall of the pipe.

Adhesives other than the epoxy resin adhesive described above are useful in the practice of the invention and in some cases would be preferred. If, for example, the resin of the pipe member were phenolic, it would normally be preferred to use a phenolic adhesive. The same resin would normally be used in the annular collars, assuming that the collars were formed of reinforced resin.

While the invention has been illustrated as a coupling for two straight lengths of pipe, it is equally applicable to elbows, T's, plugs, reducers and the like. It will also be appreciated that the coupling can be used to connect two lengths of pipe of different diameter if the clamp and gasket are so formed that one side of each fits one size of pipe, the opposite side fits the other size of pipe, and the outer circumferential surface of the gasket also matches the internal surface of the clamp. Such modifications and means for carrying them out successfully will occur to those skilled in the art when apprised of the teachings of this invention.

What is claimed is:

1. A disconnectable, rigid, fluid-tight coupling for joining two sections of rigid, thin-walled, reinforced plastic pipe in spaced end to end relation with one another, said coupling comprising a pair of spaced rigid collars for mounting on the adjacent end portions of the pipe sections to be joined, each collar being adapted for mounting on its pipe section rearwardly of the end of the pipe section whereby an end portion of each pipe section projects beyond its associated collar, and each collar having an axially elongated cylindrical inner surface for adhesive securement therealong to the outer cylindrical surface of the pipe section on which it is to be mounted, an annular sealing gasket essentially C-shaped in cross-section for positioning between said collars, the open ends of the C providing a pair of opposed feathered edges forming two separated bearing surfaces adapted to fit snugly against the free end portions of the pipe sections, the radial thickness of said collars being greater at their facing ends than at their remote ends, the facing ends of said collars forming abutment walls against which the gasket sides seat, said abutment walls being of greater height than said gasket and extending radially outwardly beyond said gasket, a split clamp member having an inner central circumferential tongue portion bearing against the portions of said facing upstanding abutment walls extending radially outwardly beyond said gasket, said clamp member having peripheral inwardly extending clamping lips bearing against the outer surfaces of said collars between the facing and remote ends thereof for maintaining said collars in abutment with said tongue.

2. A disconnectable, rigid, fluid-tight coupling for joining two sections of rigid thin-walled, reinforced plastic pipe in spaced end to end relation with one another, said coupling comprising a pair of spaced rigid collars for mounting on the adjacent end portions of the pipe sections to be joined, each collar being adapted for mounting on its pipe section rearwardly of the end of the pipe section whereby an end portion of each pipe section projects beyond its associated collar, and each collar having an axially elongated cylindrical inner surface for adhesive securement therealong to the outer cylindrical surface of the pipe section on which it is to be mounted, an annular sealing gasket essentially C-shaped in cross-section for positioning between said collars, the open ends of the C providing a pair of opposed feathered edges forming two separated bearing surfaces adapted to fit snugly against the free end portions of the pipe sections, the radial thickness of said collars being greater at their facing ends than at their remote ends, the facing ends of said collars forming abutment walls against which the gasket sides seat, said abutment walls being of greater height than said gasket and extending radially outwardly beyond said gasket, a split clamp member having an inner central circumferential tongue portion bearing against the portions of said facing upstanding abutment walls extending radially outwardly beyond said gasket, said clamp member having peripheral inwardly extending clamping lips bearing against the outer surfaces of said collars between the facing and remote ends thereof for maintaining said collars in abutment with said tongue, the outer surfaces of said collars tapering smoothly inwardly from said facing ends to said remote ends, said clamp member lips being adapted to wedgingly engage said tapering outer surfaces.

3. A coupling joining a pair of rigid thin-walled reinforced plastic pipe sections in spaced end to end relation to one another, said coupling comprising a pair of spaced rigid collars having axially elongated inside cylindrical surfaces substantially throughout their length, adhesive means on said inside cylindrical surfaces adhesively securing said collars on said pipe sections, each collar being secured to its associated pipe section rearwardly of the end of the pipe section, an annular sealing gasket essentially C-shaped in cross-section disposed over the adjacent ends of said pipe sections between said collars, the open ends of the C forming a pair of opposed feathered edges coterminal with the adjacent ends of said pipe sections and fitting snugly over the cylindrical pipe end portions projecting beyond said collars, the radial thickness of said collars being greater at their facing ends than at their remote ends, the facing ends of said collars forming abutment walls against which the sides of said gasket seat, said abutment walls being of greater radial height than said gasket and extending radially outwardly beyond said gasket, a split clamp member having an inner central circumferential tongue portion bearing against the portions of said facing upstanding abutment walls extending radially outwardly beyond said gasket, said clamp member having peripheral inwardly extending clamping lips bearing against the outer surfaces of said collars between the facing and remote ends thereof for maintaining said collars in abutment with said tongue.

4. The combination of claim 3 wherein each of said collars has a conical outer surface tapering rearwardly from said gasket abutment wall surface.

References Cited in the file of this patent

UNITED STATES PATENTS

| 1,967,467 | Damsel | July 24, 1934 |
| 2,338,307 | Staggers | Jan. 4, 1944 |
| 2,766,518 | Castanzo | Oct. 16, 1956 |
| 2,782,806 | Stambaugh et al. | Feb. 26, 1957 |

FOREIGN PATENTS

| 511,690 | Belgium | June 14, 1952 |
| 524,849 | Belgium | Dec. 31, 1953 |
| 709,161 | Great Britain | May 19, 1954 |
| 554,738 | Italy | Jan. 15, 1957 |

UNITED STATES PATENT OFFICE
CERTIFICATION OF CORRECTION

Patent No. 2,962,305            November 29, 1960

Joseph A. McCarthy et al.

It is hereby certified that error appears in the above numbered patent requiring correction and that the said Letters Patent should read as corrected below.

Column 2, lines 49 and 50, strike out "by the peripheral inwardly extending clamping lips of the clamp 16" and insert the same after "13a" in line 52, same column 2.

Signed and sealed this 23rd day of May 1961.

(SEAL)
Attest:

ERNEST W. SWIDER            DAVID L. LADD
Attesting Officer            Commissioner of Patents